United States Patent [19]

Winkler et al.

[11] 3,961,085

[45] June 1, 1976

[54] EDIBLE FOOD CASING DYED WITH AN EDIBLE DYESTUFF AND PROCESS FOR ITS MANUFACTURE

[76] Inventors: Bruno Winkler, Am Hummelberg 9, 6941 Oberflockenbach; Dieter Fritz, Konrad-Adenauer-Str. 1, 6940 Weinheim, both of Germany

[22] Filed: Feb. 11, 1975

[21] Appl. No.: 549,121

Related U.S. Application Data

[63] Continuation of Ser. No. 340,776, March 13, 1973, abandoned.

[30] Foreign Application Priority Data

Mar. 15, 1972 Germany............................ 2212399

[52] U.S. Cl................................. 426/138; 426/140; 426/250
[51] Int. Cl.²..................... A22C 13/00; A23L 1/275
[58] Field of Search ........... 426/115, 135, 138, 140, 426/250, 277, 540

[56] References Cited

UNITED STATES PATENTS

| | | | |
|---|---|---|---|
| 2,477,768 | 8/1949 | Remer | 426/135 |
| 2,973,274 | 2/1961 | Langmaack | 426/277 |
| 3,285,906 | 11/1966 | Kretlow et al. | 426/540 X |
| 3,682,661 | 8/1972 | Turbak | 426/138 |

FOREIGN PATENTS OR APPLICATIONS

| | | | |
|---|---|---|---|
| 153,790 | 10/1953 | Australia | 426/135 |

*Primary Examiner*—James R. Hoffman

[57] ABSTRACT

A dyed edible food casing is produced by effecting dyeing prior to filling of the casing. The edible dyestuff is incorporated, as such or in encapsulated form, with the raw composition awaiting extrusion. Instead, the extruded tube is itself dyed. Water-resistance is imparted to the dyestuff by admixing a cross-linkable substance.

12 Claims, No Drawings

EDIBLE FOOD CASING DYED WITH AN EDIBLE DYESTUFF AND PROCESS FOR ITS MANUFACTURE

This is a continuation of application Ser. No. 340,776, filed Mar. 13, 1973, now abandoned.

This invention relates to edible sausage casings which are dyed with an edible dyestuff, and to a process for the manufacture of such casings.

Edible food casings, especially for sausages, made of a skin fibre composition of animal origin (collagen) are known. They range in colour from practically colourless to pale yellow. In sausages where the casing is consumed as well as the filling, and especially in the case of the various boiling sausages, such as frankfurters, an increasing preference by the consumer for a strongly coloured sausage has become discernible. Thus, in some countries, such as U.S.A., France and Great Britain, certain sausages, such as the well-known "Hot Dogs", are marketed dyed red. The red dyeing is effected by surface dyeing of the sausage skin, simultaneously with the scalding or boiling process, through adding the dyestuff to the bath in which the stuffed sausage is scalded or boiled. The dyestuff is absorbed into the sausage casing.

Such a method of dyeing has several disadvantages: Firstly, uniform dyeing can be obtained only with great difficulty. The casing shows regions which are dyed more weakly or not dyed at all, depending upon how close together the sausages were lying and how adequately they have been wetted by the dyestuff liquor. Furthermore, the dyestuff tends both to bleed out and also to migrate into the sausage material. Finally, in spite of using the same dyestuff concentration, completely identical dyeing of successive batches is never achieved.

According to the invention, these various disadvantages are eliminated, at least in part, by incorporating an edible dyestuff before filling the casing with the sausage or other food material. The casing can have a dyestuff content of from 0.1 to 2% relative to solid content.

The dyestuff may be applied to the unfilled casing, preferably by an immersion or spraying operation, or may be incorporated with the raw casing composition prior to extrusion.

Whilst there are numerous dyestuffs which are permitted under the foodstuff law, most of them are not intended directly for consumption. The food casing according to the invention is intended for direct consumption and, in consequence, can only contain dyestuffs which are suitable for that purpose such as, for example, the well-known egg dyes.

In principle, all permitted foodstuff dyestuffs can be considered for dyeing the base composition of these casings. These dyestuffs are all readily water-soluble compounds which can be used individually or in mixtures with one another. Preferably, one or more of the following dyestuffs is used in dyeing food casings in accordance with the invention.

1. RED - No. 2

General description - Amaranth; C.I. Food Red 9; Foodstuff Red No. 3; Bordeaux S
Colour Index (1956) No. 16,185
Chemical description: Trisodium 1-(4-sulpho-1-naphthylazo)-2-naphthol-3,6-disulphonic acid.

2. RED - No. 3

General description - Erythrosin; C.I. Food Red 14
Colour Index (1956) No. 45,430
Chemical description: Disodium tetraiodofluorescein or hydroxy-4-iodo-O-carboxy-phenylfluorone.

3. YELLOW - No. 5

General description - Tartrazine; C.I. Food Yellow 4; Foodstuff Yellow No. 2
Colour Index (1956) No. 19,140
Chemical description: Trisodium 3-carboxy-5-hydroxy-1-p-sulphophenyl-4-p-sulphophenylphenyl-azopyrazole.

4. YELLOW - No. 6

General description - Sunset Yellow F C F; C.I. Food Yellow 3; Foodstuff Orange No. 2; Jaun Orange S; Jaune Soleil.
Colour Index (1956) No. 15,985
Chemical description: Disodium 1-p-sulphophenylazo-2-naphthol-6-sulphonic acid.

The sausage casings can be dyed during the extrusion, washing and drying process, for example by immersion or spraying with an aqueous dyestuff solution.

Thus, the dyeing can be carried out in any of the following ways, which are given for illustrative purposes:

a. During the wet extrusion process, by adding 0.5 to 8% of dyestuff to the last plasticiser bath.

Process steps:

aa. The casing is passed flat (that is to say, uninflated) through the last plasticiser bath, which contains added dyestuff.
ab. The adhering excess dyestuff solution is squeezed out by means of squeezer rollers.
ac. The inflated dyed casing is dried and subsequently gathered up.

b. Instead, in the case of the wet extrusion process, by spraying the inflated casing with an aqueous dyestuff solution, removing excess dyestuff by process step ab above, with subsequent drying and gathering up.

c. In the dry extrusion process, by spraying the inflated and pre-dried casing with an aqueous solution consisting of 0.5 to 6% of sodium bicarbonate or sodium acetate or sodium lactate,
2 to 10% of glycerine, sorbitol or similar plasticisers, and
0.5 to 8% of edible dyestuff with subsequent drying, winding up and gathering.

The percentages given relate to the water contents of these solutions.

d. In the case of the dry spinning process, dyeing can also be effected by mixing the dyestuff, as a dispersion with a protective colloid, such as gelatine or carboxymethylcellulose, into the fibre composition from which the food casing is manufactured by extrusion.

e. In processes $a$, $b$ and $c$, the dyestuff is applied externally to the casing. It is, however, also possible to apply an aqueous dyestuff solution through the core of the extrusion head onto the inner wall of the casing tube. This can be effected by means of a metering orifice or a pressure atomising jet.

Dyed food casings manufactured by processes ($a$) to ($c$) above, whilst meeting the set requirements, have the disadvantage that on handling the dyed filled casings the dyestuff colours the hands and various objects. In this respect, bulk dyeing is somewhat more advantageous than the surface application of the dyestuff, (for example by spraying) since in the case of bulk dyeing the dyestuff in the casing is uniformly distributed through the collagen and does not adhere merely to the surface. However, even in the case of a bulk-dyed casing the dyestuff still tends to exude from the casing and not to adhere sufficiently firmly to the collagen. This phenomenon is attributable to the fact that practically all edible dyestuffs are water-soluble and the collagen compositions, which contains a large amount of water, practically amounts to an aqueous medium.

This disadvantage can be avoided by fixing the dyestuff to the casing. Fixing is advantageously effected by mixing the dyestuff solutions or dyed plasticiser baths with substances which can be cross-linked under the action of heat and/or of curing or tanning agents. Such substances include proteins, cellulose or cellulose derivatives, pectins, alginates and similar builders. Suitable proteins include gelatine, casein and collagen. Cellulose and its derivatives such as, for example, methylcellulose and ethylcellulose, are on the same footing as gum arabic and guar gum as suitable pectin-like builders. The percentages of the cross-linkable substance added may be from 0.1 to 2% based on the water content of the dyestuff solutions. The dyestuff particles applied in this manner are embedded in the proteins mentioned. The abovementioned substances can be cross-linked to the collagen of the casing by adding tanning agents such as glutaraldehyde, glyoxal, aluminium sulphate and others. A certain degree of cross-linking and water resistance can also be produced, without the use of tanning agents, from a heat treatment in hot air, typically at 70° to 105°C for from 4 to 10 hours.

A further very effective method of fixing the dyestuff in the collagen consists of embedding it in a hydrophobic substance, for example, fat, and then emulsifying this in the collagen composition. Thus the water-soluble food dyestuffs, preferably finely ground, can be encapsulated in fat and mixed, in this fat-embedded form, into the collagen composition prior to extrusion. However, the utilisation of the dyestuff is not entirely satisfactory when this procedure is adopted.

Surprisingly, it has been found that good utilisation of the dyestuff coupled with excellent fixing of the dyestuff in the collagen is achieved if the dyestuff is first applied to a carrier and the dyed carrier is then surrounded by a hydrophobic encapsulating substance. Suitable dyestuff carriers comprise all insoluble, swellable or non-swellable materials which are edible or harmless. Preferably, a white or colourless carrier substance is used so that the colour shade of the dyestuff is not changed by the intrinsic colouration of the carrier. Examples of suitable carrier materials are cellulose and cellulose derivatives in the form of fibres or powders, starch powders, collagen powders and casein powders. Of course, the carrier may also be a mixture of two or more of these materials.

Appropriately, the carrier, which consists, for example, of particles of a finely ground cellulose powder, is dyed with a relatively concentrated solution of the dyestuff and then dried. Thereafter, the dyed carrier particles are surrounded by a hydrophobic encapsulating substance. Possible hydrophobic encapsulating substances comprise all those oils and fats which are customarily used in the foodstuff field, for example, synthetic glyceride mixtures, sunflower seed oil, beef suet and lard. High-melting fats and waxes, such as, for example, beeswax and paraffin, alone or mixed with other fats and oils, can also be used.

If the encapsulating substance used is one which easily forms aqueous emulsions, the encapsulated dyestuff carrier can be directly introduced into the aqueous collagen composition and distributed, by kneading or mixing, to give a sufficiently fine emulsion. In the case of hydrophobic substances which are difficult to emulsify, for example, beeswax, it is preferred first to manufactured a relatively concentrated itermediate emulsion of the wax composition containing the encapsulated carrier, and then to add this to the collagen composition. This substantially shortens the mixing and distribution times. To manufacture an intermediate emulsion, the fat paste or wax paste which contains the dyestuff carrier is preferably introduced, with vigorous stirring, into an amount of water which is not too great. Emulsifying auxiliaries, for example ammonia, hydrolysed lactalbumin or lecithin can be added to the aqueous phase.

It is desirable to grind the dyed dyestuff carrier finely after drying and before encapsulating with the hydrophobic substance. To retain the free-flowing character of the ground dyed carrier, a separating agent, preferably carboxymethyl cellulose powder, is advantageously mixed therewith. The dyed carrier can be treated with an auxiliary agent to maintain its free flowing character.

The encapsulation of the powder of dyed dyestuff carrier with the hydrophobic encapsulating substance is carried out in such a way that the encapsulating substance completely encloses each individual dyestuff carrier particle. This is best achieved by introducing the finely divided dyed carrier into the liquid composition of the hydrophobic substance. The ratio of the quantities of carrier and encapsulating substance, such as fat or wax, is so chosen as to give a mass which is not too viscous. In the case of higher-melting hydrophobic substances such as, for example, beeswax, the dyed carrier is introduced into the melt.

Instead of using the dyestuff it is also possible — where they are harmless — to use dyestuff lakes which are, as a rule, complex salts of a dyestuff with a polyvalent metal, such as aluminium. It is possible for the dyestuff lake to be produced only during the final tanning treatment with an aluminium salt, when the dyestuff required for forming the dyestuff lake is incorporated into the composition.

Instead of collagen, other edible artificial casings comprising, for example, polyvinyl alcohol and alginate can also be dyed in accordance with the invention.

The process of the invention is illustrated by the following Examples:

EXAMPLE 1

Dyeing during plasticisation: A collagen paste containing 10% of dry collagen is extruded in a known manner on a blowing extruder, using an annular slit die, to give a tube of size 32 mm diameter. The inflated tube is pre-dried with warm air in a dyring tunnel. At the tunnel outlet, the outside of the tube is sprayed, using an annular jet, with an aqueous solution which consists of 2% of sodium bicarbonate, 4% of glycerine and 2% of red dyestuff [RED No. 3, referred to hereinbefore under item 2)]. Thereafter the sprayed casing is dried, wound up and gathered.

EXAMPLE 2

Fixing the dyeing with casein: A collagen tube manufactured in the same manner as in Example 1, by the dry extrusion process, is sprayed, after pre-drying, with an aqueous solution which corresponds to that of Example 1 but additionally contains 1% of casein powder. The tube is subsequently heated for 4 hours to about 80°C.

EXAMPLE 3

Bulk dyeing: A dispersion of 350 g of dyestuff (RED No. 2), 500 g of carboxymethylcellulose (CMC) and 20 liters of water is homogeneously mixed into 100 kg of a collagen paste having a dry collagen content of 12%. Thereafter the collagen paste dyed in this way is shaped by the extrusion blowing process to give a collagen tube of size 32 mm diameter. The tube is then pre-dried in a drying tunnel as described in Example 1, sprayed with a plasticiser solution, dried further and coiled up.

EXAMPLE 4

600 g of a sparingly water-soluble edible dyestuff lake of the aluminium salt of the dyestuff "Ponceau 6 R", Colour Index Number 16,290, in a very finely powdered form, are mixed with 600 g of CMC powder. The resulting powder mixture is introduced into 1.5 kg of sunflower seed oil and worked into a lump-free paste.

2.7 kg of this paste are introduced into 100 kg of collagen composition and uniformly mixed in. The resulting coloured collagen composition is extruded, without a dwell time, to give collagen tubes.

The following test for fixing was carried out with the collagen tubes manufactured according to the examples:

1 m of collagen tube was kept for 1 hour in 0.5 l of water at 80°C with occasional swishing. The transfer of colour into the aqueous phase which hereupon occurs is recorded in the table which follows. Herein the symbols denote:

| Example No | 2 Hours cold water | 2 Hours hot water at 80°C |
|---|---|---|
| 1 | ++ | ++ |
| 2 | + | ++ |
| 3 | + | ++ |
| 4 | 0 | 0 |

++ Strong colouration of the water,
+ weak colouration of the water and
0 no transfer from dyestuff into the aqueous phase.

We claim:

1. An unfilled edible food casing suitable for use as a casing for sausage comprising an edible casing material dyed with an, edible dyestuff which is contained in the casing, the dyestuff being encapsulated by a hydrophobic substance selected from the group consisting of edible oils, fats, waxes, and mixtures of these substances, so that the dyestuff is fixed in the casing in a water-resistant manner.

2. A casing as claimed in claim 1, wherein the hydrophobic encapsulating substance is a material selected from the group consisting of a synthetic glyceride mixture, sunflower seed oil, beef suet, lard, beeswax and a paraffin wax, and mixtures thereof.

3. A casing as claimed in claim 1, wherein the dyestuff is applied to an edible carrier material which is in turn encapsulated by the hydrophobic substance, the edible carrier material being selected from the group consisting of cellulose, a cellulose derivative in the form of a powder or fiber, starch powder, collagen powder, casein powder, and mixtures thereof.

4. A casing as claimed in claim 1, having a dyestuff content of from 0.1 to 2.0% relative to solid contents.

5. A casing as claimed in claim 1, wherein the edible casing material comprises collagen.

6. A casing as claimed in claim 1, wherein the edible casing material comprises an alginate.

7. A casing as claimed in claim 1, wherein the edible casing material comprises a polyvinyl alcohol.

8. A process for the manufacture of a dyed, unfilled, edible, food casing which is dyed with a dye in a water resistant manner and is suitable for use as a casing for sausage, comprising dyeing said unfilled casing with an edible, water soluble dyestuff admixed with a cross linkable substance, and fixing the dyestuff in the casing by heating for cross linking of said substance to provide said water resistance.

9. A process as claimed in claim 8, wherein said substance is a material selected from the group consisting of cellulose, cellulose derivatives, pectins, alginates, and proteins.

10. Product produced by the process of claim 8.

11. A process for the manufacture of a dyed, unfilled, edible food casing which is dyed with a dye in a water resistant manner and is suitable for use as a casing for sausage, comprising encapsulating the dyestuff in finely divided form with a hydrophobic substance to render the dye water resistant, and combining the encapsulated dye with the casing for said dyeing.

12. A process as claimed in claim 11, wherein said hydrophobic substance is a material selected from the group consisting of edible oils, fats, waxes, and mixtures thereof.

* * * * *

UNITED STATES PATENT AND TRADEMARK OFFICE
CERTIFICATE OF CORRECTION

PATENT NO. : 3,961,085
DATED : February 11, 1975
INVENTOR(S) : Bruno Winkler and Dieter Fritz It is certified that error appears in the above-identified patent and that said Letters Patent are hereby corrected as shown below:

First page, add:

[73] Assignee: Naturin-Werk Becker & Co.
Weinheim, Germany

Column 6, line 4, (claim 1), cancel the comma after "an".

Signed and Sealed this

Seventeenth Day of May 1977

[SEAL]

Attest:

RUTH C. MASON
*Attesting Officer*

C. MARSHALL DANN
*Commissioner of Patents and Trademarks*